US005954079A

United States Patent [19]

Barth et al.

[11] Patent Number: 5,954,079

[45] Date of Patent: Sep. 21, 1999

[54] ASYMMETRICAL THERMAL ACTUATION IN A MICROACTUATOR

[75] Inventors: Phillip W. Barth, Portola Valley, Calif.; Tak Kui Wang, Havertown, Pa.; Rodney L. Alley, Wilmington, Del.

[73] Assignee: Hewlett-Packard Co., Palo Alto, Calif.

[21] Appl. No.: 08/640,011

[22] Filed: Apr. 30, 1996

[51] Int. Cl.[6] .......... F16K 31/04

[52] U.S. Cl. .......... 137/13; 251/11; 251/129.01

[58] Field of Search .......... 251/11, 129.01; 137/13

[56] References Cited

U.S. PATENT DOCUMENTS

| | | | |
|---|---|---|---|
| 5,029,805 | 7/1991 | Albarda et al. | 251/11 |
| 5,058,856 | 10/1991 | Gordon et al. | 251/11 |
| 5,069,419 | 12/1991 | Jerman | 251/129.01 |
| 5,333,831 | 8/1994 | Barth et al. | 251/129.01 |

*Primary Examiner*—A. Michael Chambers
*Attorney, Agent, or Firm*—Mark Z. Dudley

[57] ABSTRACT

A microminiature valve having an actuator member that includes a central body suspended on radially spaced legs, with each leg having first and second layers of materials having substantially different coefficients of thermal expansion. The legs include heating elements and are fixed at one end to allow radial compliance as selected heating of the legs causes flexure. An actuator member includes a boss having an actuator face. A seat substrate having a flow via defined by a valve seat is aligned with the actuator face. Asymmetrical thermal actuation of the actuator member moves the actuator face from the valve seat in a rotational displacement relative to the flow orifice, thereby offering improved control of the fluid flow through the orifice.

18 Claims, 7 Drawing Sheets

ASYMMETRICAL THERMAL ACTUATION IN A MICROACTUATOR

FIELD OF THE INVENTION

The present invention relates generally to microminiature devices and more particularly to thermally-actuated microminiature valves.

BACKGROUND OF THE INVENTION

The development of microminiature mechanical devices has advanced generally by use of a technique known as micromachining or microfabrication. See for instance, the discussion of microfabrication of mechanical devices by Angell et al. in "Silicon Micromechanical Devices," *Scientific American*, (April 1983), pp. 44–55.

A fundamental requirement of a micromechanical actuator (hereinafter, microactuator) is that some mechanical actuation means must be provided. A further requirement is that the actuation means must provide sufficient force for reliable actuation. For example, a microminiature device may comprise a valve used to control the flow of a carrier gas through a capillary column in a gas chromatograph. A microactuator may be required to open or close a fluid passage in the valve by displacing a moveable member (typically a moveable membrane, diaphragm, or boss) against a pressure of up to 200 pounds per square inch (1375 kilopascals), through a distance of as much as 100 micrometers.

Typically, electrical power from an external source is provided to the microactuator, which employs one of various techniques to convert the applied power to an actuating force. Often the applied electrical power is converted in part or whole to thermal power, and such microactuators can be considered as being thermally-actuated.

As disclosed in U.S. Pat. No. 5,058,856, an array of micromachined bimetallic legs has been employed to provide a thermal actuating force in a microminiature valve. The microminiature valve includes an actuator having radially spaced, layered spider legs, with each leg having first and second layers of materials having substantially different coefficients of thermal expansion. The legs include heating elements and are fixed at one end to allow radial compliance as selected heating of the legs causes flexure. Below the legs is a semiconductor substrate having a valve seat that defines a flow orifice. The actuator face is aligned with the valve seat. Flexure of the legs displaces the actuator face relative to the valve seat, thereby controlling fluid flow through the flow orifice.

However, the design and operation of such a valve is subject to a complex group of thermal, mechanical, and pneumatic constraints. Proportional control of gas flow at a wide range of supply gas pressures (from zero to 200 psi) and a wide range of flow rates (0.1–1000 standard cubic centimeters per minute (sccm)) requires significant actuation force and adequate stiffness in the mechanical structure. Further, the increase or decrease in the flow rate that occurs as the actuator face respectively moves to and from the orifice must be wellcontrolled.

For example, if the microminiature valve is normally closed when no power is applied, and if the thermal resistance from the actuator to its surroundings is low, the valve will require a relatively large amount of power to open, but will cool rapidly when power is removed and so will close rapidly. If the thermal resistance from the microminiature valve to its surroundings is high, the microminiature valve will require less power for to open, but will cool more slowly, and so will be slower to close.

In particular, FIG. 1 illustrates the measured response of flow rates of Helium to voltages applied to a conventional valve operating at supply pressures of 50 and 100 psi. Upon comparison of the response curves A and A' with curves B and B', the measured response indicates a hysteresis condition because more power is required to open the valve than to hold the valve open. A thermal hysteresis loop is evident as movement of the actuator face is initially subject to restraint due to the high supply pressure, then lifts from the valve seat when a threshold of substantial applied power is exceeded. The abrupt change causes the flow rate to increase at an abrupt and very high rate.

We have discovered that such abrupt action occurs because the separation of the actuator face from the seat allows the thermal conductance between the actuator face and valve seat to decrease rapidly and this decreased conductance causes the actuator to warm rapidly at an essentially constant input power. As a result, the valve opens in a fashion that is not easily controlled, as indicated by the nearly vertical slopes of the low flow rate portions of curves A and A'. In other words, the actuator will "snap" to an open position instead of moving gradually. Similarly the valve can "snap" close when the actuator approaches the valve seat from an open position. The effect is especially severe when the actuator face is constrained to move in an "irrotational" fashion, that is, when the actuator face maintains a parallel relationship with the valve seat while moving along an axis that is perpendicular to the valve seat, as taught in U.S. Pat. No. 5,069,419.

Accordingly, there is a need for a thermally-actuated microactuator, and in particular a thermally-actuated microminiature valve, which efficiently produces a controlled, gradual movement throughout the entirety of a its range of displacement when operated in the conditions described above.

FIG. 2 illustrates the displacement of an actuator in a typical thermally-actuated valve that is designed to exhibit irrotational actuating motion in response to an applied power. As indicated, in comparing the power required to maintain the actuator at positions proximate or distant from the valve seat, one may observe that much more power is required to maintain the actuator at a position proximate to the valve seat. However, prior art approaches have not sufficiently addressed this power loss during operation of a microactuated valve at low flow rates.

Accordingly, it is also desirable to minimize the power consumed by a microactuator subject to the above-described low-flow/high supply pressure conditions, and especially to reduce the power consumed by a microminiature valve where fast actuation is not critical. Accordingly, there is a need in thermally-actuated microactuators for improved efficiency of thermal actuation.

SUMMARY OF THE INVENTION

The present invention is directed to a microactuator having an asymmetrical thermal actuator constructed to operate according to mode designated herein as asymmetrical thermal actuation. An actuator face is displaced from a resting position to an actuated position by the asymmetrical thermal actuator wherein the displacement is characterized as having rotational movement, that is, movement of the actuator face while the actuator face assumes an increasingly oblique angle with respect to its orientation at the resting position. The contemplated rotational movement is distinguishable from irrotational movement which may be considered to be movement aligned with a central perpendicular axis that extends from the actuator face at its resting position. For the purposes of this description, such irrotational movement will be considered to be substantially equivalent to the irrotational movement observable in a thermally-actuated microactuator operated according to the prior art wherein symmetrical heating of the microactuator is provided.

A microactuator, and in particular a thermally-actuated microminiature valve for controlling the flow of a fluid, may be constructed according to the present invention to include an orifice member formed in a seat substrate having opposed first and second major surfaces and a flow via extending from the first major surface to the second major surface, an integral annular wall structure extending from said first major surface, wherein the annular wall structure surrounds the flow via and including a valve seat. An actuator member formed in an upper substrate is positioned adjacent the seat substrate and includes an actuator face positionable in a resting (i.e., closed) position with respect to the valve seat so as to obstruct fluid flow through the flow via.

In a particular feature of the invention, the actuator member of the contemplated valve is constructed to operate according to asymmetrical thermal actuation. The actuator face is therefore displaced with respect to the valve seat to permit a controlled rate of fluid flow through said flow via. Due to the asymmetrical thermal actuation, the contemplated displacement of the actuator face is characterized by rotational movement, that is, movement of the actuator face while the actuator face assumes an increasingly oblique angle with respect to the valve seat. The contemplated rotational movement is distinguishable from irrotational movement which may be considered to be movement aligned with a central axis that extends perpendicularly from the plane defined by the surface contact of the valve seat and the actuator face when the valve is closed.

In one particularly preferred embodiment, the actuator displacement is entirely rotational such that contact between the actuator face and the valve seat is maintained throughout the displacement at a fulcrum point therebetween.

In another preferred embodiment, such displacement is exclusively rotational during an initial phase and is combined with orthogonal movement during a subsequent phase. For the purposes of this description, "orthogonal" movement will be considered to describe movement of the contemplated microactuator along an axis that extends perpendicularly from the plane defined by the surface contact of the valve seat and actuator face when the valve is closed. Orthogonal movement may be considered to be substantially equivalent to irrotational movement except that the abrupt, "snap" motion, described hereinabove with respect to the prior art, is reduced or eliminated.

In yet another preferred embodiment, the actuator may be selectively operated at certain times to provide symmetrical thermal actuation so as to effect irrotational movement of the actuator face, and at other times may be selectively operated to provide asymmetrical thermal actuation so as to effect a combination of rotational and orthogonal movement of the actuator face.

Accordingly, a thermally-actuated microminiature valve for controlling the flow of a fluid may be constructed according to the present invention to include means for providing asymmetrical thermal actuation. In one embodiment, such asymmetrical thermal actuation is provided by thermal actuation of selective ones of a plurality of bimetallic members on multiple legs arrayed like the legs of a spider around a central body. The legs are rigidly fixed at one end and are suspended at a second end in a manner to accommodate flexing. The central body and legs combine to form a first deflectable member, designated the actuator member. The microminiature valve includes a second member, designated the orifice member, that includes a rigid seat substrate having a central flow orifice surrounded by a raised valve seat. The actuator member is positioned atop the orifice member. The center of an actuator face on the bottom of the central body is substantially aligned with the center of the central flow orifice on the top of the orifice member. The microminiature valve may be normally-closed or normally-open, depending upon the orientation of the fixed and flexibly supported ends of the legs.

The flexible support of one end of the legs is accomplished by a flexible suspension. This suspension accomplishes a hinge-like support of one end of each leg. One preferred embodiment of the flexible suspension is implemented by rings of circumferential slots. Either the inner end proximal to the central body or the end distal from the central body may include the flexible suspension. If the suspension is placed on the inner ends of the legs, the valve will close when actuated; if placed on the outer ends, it will open.

In the normally-closed embodiment, the ends of the legs distal from the central body are connected by the flexible suspension, and the proximal ends are rigidly connected to the central body. When placed on the outer ends, the suspension accomplishes the further purpose of minimizing loss from the hot legs to the ambient environment by both decreasing the cross-section area and increasing the path length through which heat flow can occur. In one particularly preferred embodiment, the spider legs comprise four evenly-distributed and radially extending members arranged in an "x" configuration.

The actuator member may be constructed to include one or more bimetallic members and is referred to as a "bimorph" structure. Each bimetallic member thus comprises at least two layers. First and second layers of the member are made of materials having substantially different coefficients of thermal expansion. Heating means distributed on the actuator member are used to heat the bimetallic members and cause deflection of the respective legs. As certain ones of the bimetallic members are actively heated, while certain others remain substantially unheated, asymmetrical thermal actuation causes the heated members to arch by differential expansions of the first and second layers, thereby causing a rotational movement of the actuator face relative to the central flow orifice of the orifice member. Alternatively, certain legs may include a bimetallic member, while in other legs the bimetallic member is absent or made inoperable. Activation of the operable bimetallic members then causes asymmetrical thermal actuation of the actuator member.

In still another alternative embodiment, each leg may incorporate a bimetallic member, but the heating means may be constructed to operate non-uniformly. Resistive heaters, such as metal film resistors, may be evenly distributed on the legs or on the central body but selectively powered to cause asymmetrical introduction of heat to the central body. Alternatively, the heating means may be constructed to include resistive elements, the resistance of which is varied according to the position of the resistive filament on the actuator member. Power applied to all of the resistive elements will result in an asymmetrical heating, thus causing asymmetrical thermal actuation.

In an alternative embodiment, the contemplated thermal asymmetry may be realized by constructing the microactuator to include the actuator face on the bottom of the central body and located at a position that is laterally offset with respect to the center of the central flow orifice. As a result, when the valve is closed, the distribution of thermal resistances in the thermal paths from the actuator member to the orifice member is asymmetric. Accordingly, heat applied to the actuator member is therefore dissipated to a greater extent in one portion of the orifice member in comparison to the remainder of the orifice member, thus causing the actuator member to experience a substantially asymmetric distribution of heat. The actuator member is thereby subject to asymmetrical actuation as if the distribution of applied heat had been applied asymmetrically.

The factors to be considered in choosing materials for constructing the actuator member include coefficients of thermal expansion, melting points, strengths, and ease of use in integrated circuit fabrication processes. In the preferred embodiment, the first layer, closest to the seat substrate member, is silicon. The second layer is a material chosen to generally have a high strength, a high coefficient of thermal expansion, and a reasonably high melting point. Nickel rates well against these parameters, and is amenable to fabrication by both plating and deposition.

The contemplated valve is optimized for accurate flow control of fluids supplied at high pressures, such as several hundred PSI. The valve operates more reliably and with much higher performance in terms of flow and pressure control, in comparison to valves constructed according to the prior art.

DETAILED DESCRIPTION OF THE INVENTION

Whereas the following description is directed to a microactuator in the form of a microminiature valve, it is contemplated that the teachings of the present invention may find application in other types of thermally-actuated devices that operate at an elevated temperature. This characterization of devices as being "thermally-actuated" is meant to include those that operate on the conversion of an applied power into an actuation force for moving a movable member, wherein the conversion benefits from conservation or isolation of the thermal energy that may arise in the course of the conversion. Examples are microactuators that are driven by forces developed in a process of gas or liquid expansion/contraction, gas or liquid phase change, or according to changes in bi-morph, bi-metallic, or shape-memory materials.

Accordingly, the present invention will find use in a variety of microactuators that may be employed to operate upon a mechanical device or system, or upon a physical phenomena, such as the flow of fluids (including gases and liquids), electrical and electronic parameters (such as capacitance, current flow, and voltage potential), acoustical and optical parameters (such as reflection, absorption, or diffraction) and simple dimensional parameters (such as acceleration, pressure, length, depth, and so on).

Figure 1:
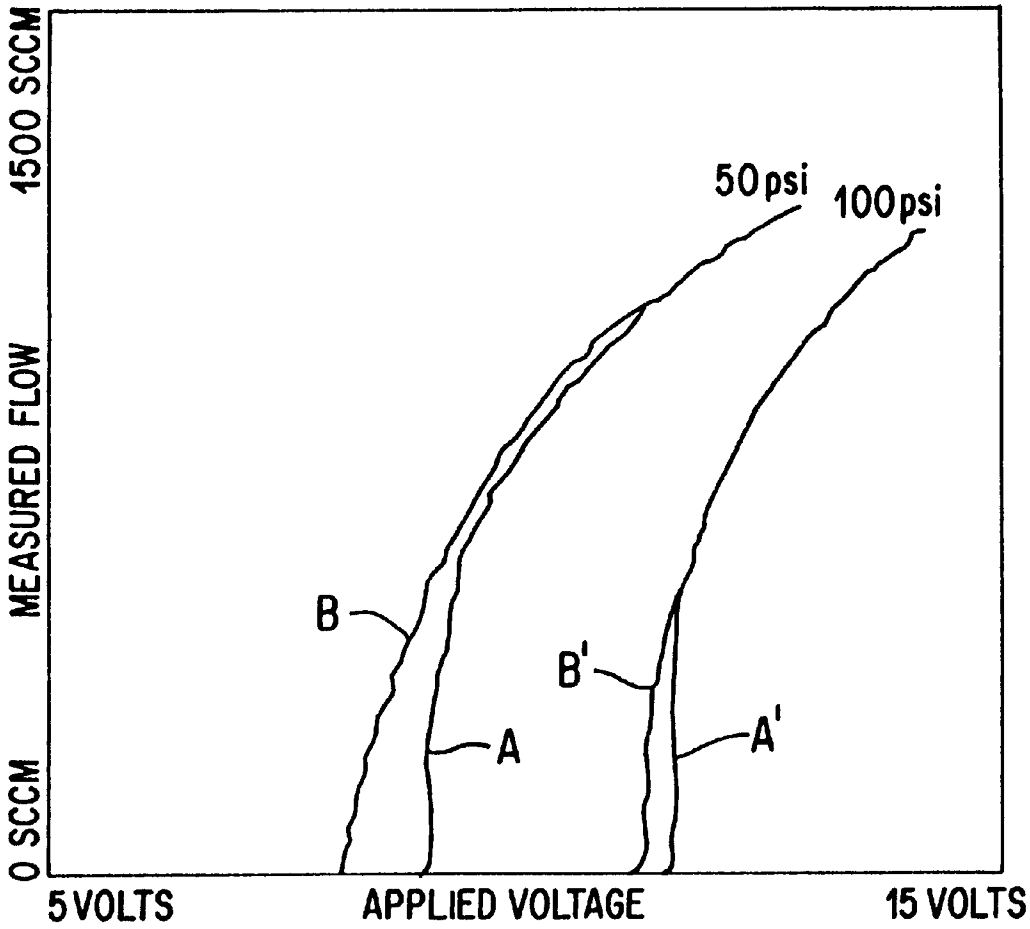
FIG. 1 PRIOR ART
FIG. 1 is a graphical representation of the flow rate measured in a prior art thermally-actuated microminiature valve in response to a voltage applied to the bimetallic heating section.
Figure 2:
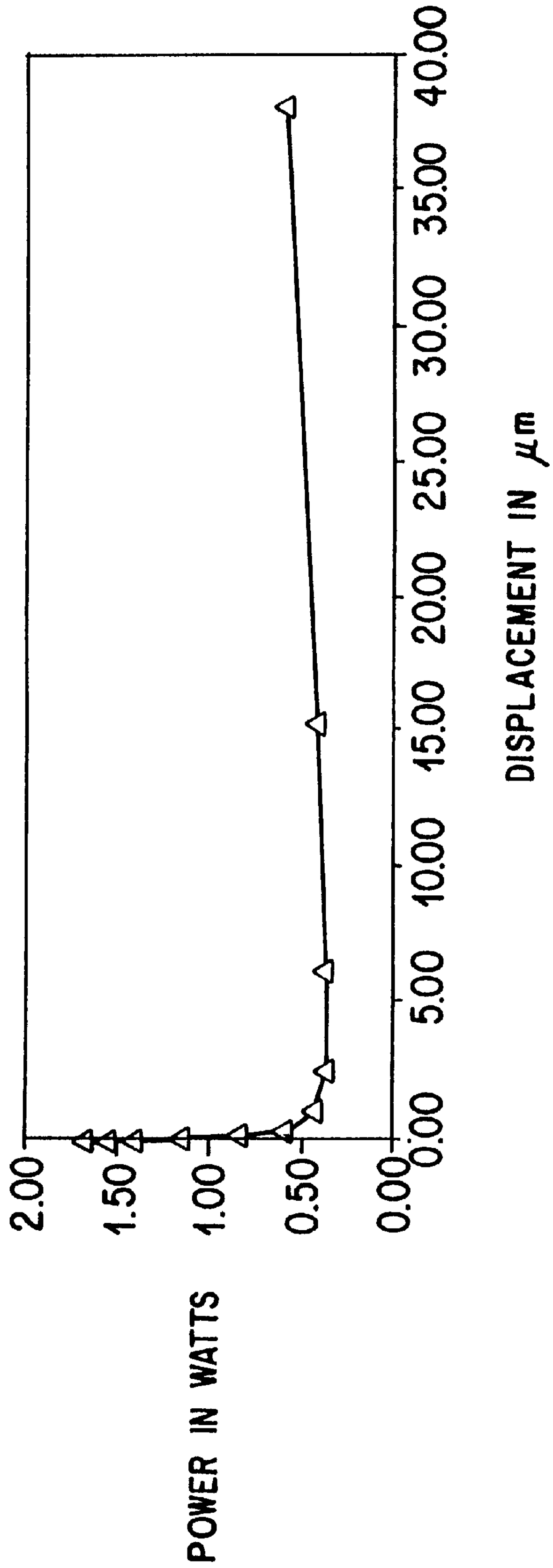
FIG. 2 PRIOR ART
FIG. 2 is a graphical representation of the displacement calculated for a prior art thermally-actuated microminiature valve in response to power applied to the bimetallic heating section.
Figure 3A:
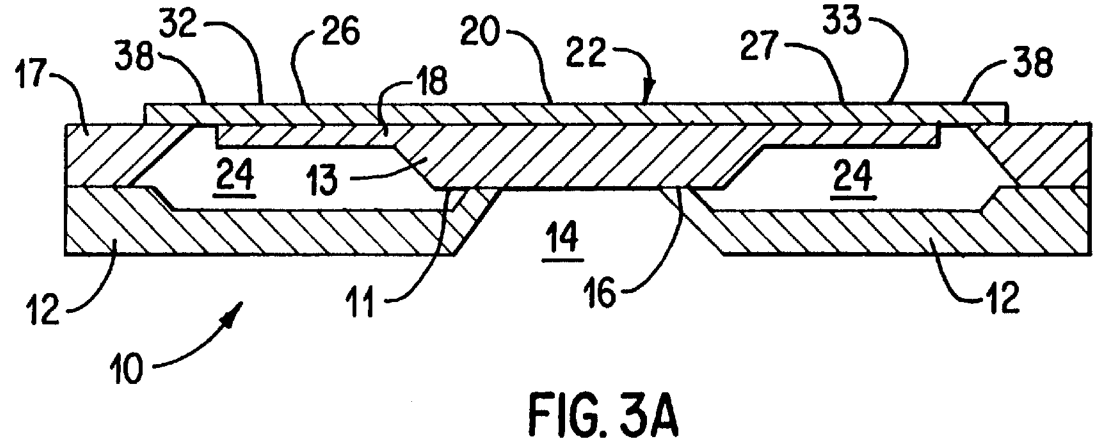
FIG. 3A is a side sectional view of a microminiature valve having a flow orifice and a valve seat constructed in accordance with the present invention.
Figure 3B:
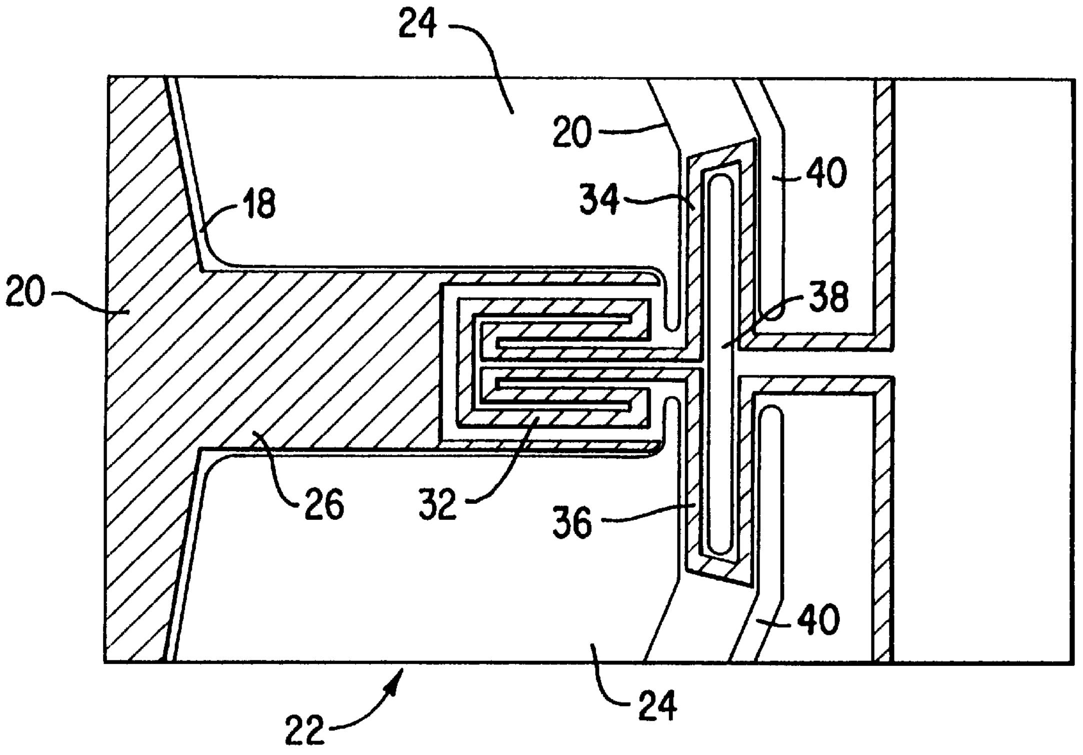
FIG. 3B is a detailed plan view of a leg portion of the actuator member of the microminiature valve of FIG. 3A.
Figure 3C:
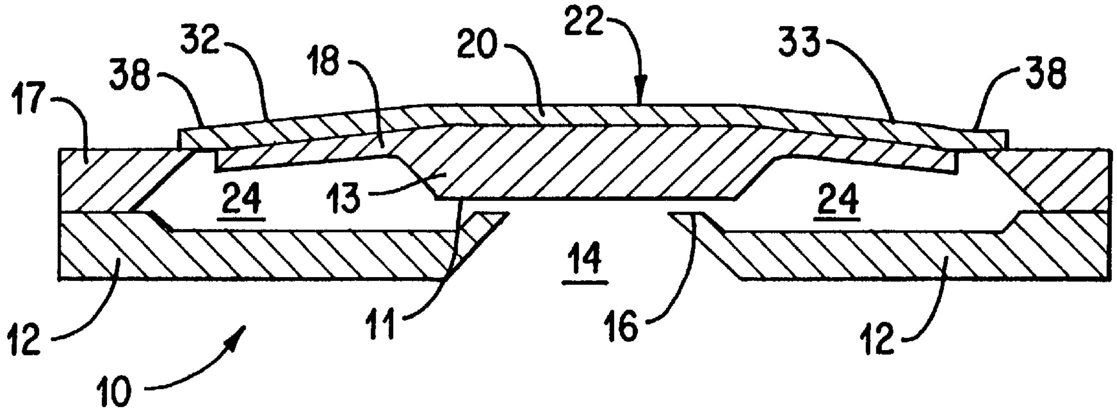
FIG. 3C is a side sectional view of the microminiature valve of FIG. 3A during or after opening movement of the actuator member.

As illustrated in FIGS. 3A–3C, a preferred embodiment of a thermally-actuated microactuator may be constructed in the form of a microminiature valve 10. The valve 10 is preferably constructed to operate in a normally-closed fashion. The basic structure of the valve 10 may be understood with reference to commonly-assigned U.S. Pat. No. 5,058,856 to Gordon et al. and commonly-assigned U.S. Pat. No. 5,333,831 to Barth et al., the disclosures of which are incorporated herein by reference. The special construction of the valve 10 in accordance with the teachings of the present invention will now be described.

With reference to FIG. 3A, the valve 10 is shown as including a seat substrate 12, which acts as a base, and an upper substrate 18. A central flow via 14 is formed through the seat substrate 12. Supported atop the seat substrate 12 in the upper substrate 18 are a fixed periphery 17 and an actuator member 22. The actuator member 22 includes a central boss 13 having an actuator face 1 1, metallic layer 20, heating elements 32, 33 on respective opposing legs 26, 27, and flexible suspension 38.

The actuator member 22 is constructed as an integral, thermally-driven actuator preferably having an array of bi-metallic regions, elements, or members. The terms "bi-metal" and "bi-metallic" are not limited to their conventional sense; for example, one or both portion within the bi-metallic element may actually be non-metallic. Preferably, in the illustrated embodiment, one portion within the bi-metal member is the metallic layer 20, formed preferably of nickel, and the other portion within the bi-metal member is the central boss 13 formed of silicon.

Both the silicon and nickel layers have roughly triangular openings 24 that define an array of spider legs 26, 27. In operation, upon opening of the valve, gas will flow through the openings 24 and through the flow orifice 14 described above.

For example, each leg 26 and 27 is rigidly connected at a radially inward end to the central body of the actuator member 22. Each leg 26, 27 includes a serpentine pattern of nickel which acts as a heating element 32, 33. Conduction of a current through the heating elements generates localized heating which then conducts through the silicon and nickel layers that make up the legs 26, 27. Electrical paths to and from each heating element are serpentine metal depositions on the silicon layer 18, arranged such that the heating elements 32, 33 may be selectively activated. The upper surface of the valve 10 includes appropriate conductive pads and drive circuitry, not shown, to channel a current to one or both of the heating elements 32, 33.

The seat substrate 12 is preferably a silicon orifice chip which has been fabricated from a wafer using batch processing steps. The central flow via 14 is formed through the seat substrate 12. (The term "via" is used herein to describe a fine through-hole in a fabricated layer.) The valve seat 16 in the seat substrate 12 is defined by a raised annular wall structure preferably in the form of a hollow, truncated pyramid. For the purposes of this description, the term "annular" is meant to include polygonal as well as circular or conical formations. The annular wall structure includes an orifice circumscribed by the valve seat 16. The actuator face 11 is seated against the valve seat 16 when the central boss 18 is in the closed position. The width of the valve seat 16 may be varied, but is chosen to be sufficiently wide that the valve seat is not susceptible to fracturing upon repeated contact between the valve seat 16 and the actuator face 11.

In operation, FIG. 3A shows the microminiature valve 10 in a closed condition in which the boss 13 abuts the valve seat 16 to prevent flow into the fluid flow orifice 14. With no power applied, the central boss 13 covers the central flow via 14 and contacts the valve seat 16, preventing gas flow. Current through the metal deposition path in elements 32, 33 will cause the temperature of the respective leg 26, 27 to increase. The central boss 13 lifts from the valve seat 16, thus permitting gas flow through the orifice 14. The circumferential slots allow the spider legs to arch, thereby causing displacement of the actuator face 11 relative to the valve seat 16, and flow orifice 14. With the flexible suspension at the radially outer ends, the boss 13 will move from the normally closed position of FIG. 3A to the open position of FIG. 3C.

As shown in FIG. 3B, each leg 26 and 27 is associated with a plurality of circumferential slots 38 and 40 formed through both the silicon layer 18 and the nickel layer 20. The slots serve three roles. Firstly, the slots provide a large degree of thermal isolation of the legs from the silicon layer radially beyond the legs. Thus, less power is needed to achieve a desired deflection of the legs. Secondly, the circumferential slots 38 and 40 provide flexibility at the boundaries of the legs. The flexibility accommodates the movement experienced at these boundaries as the legs expand and arch during heating cycles and contract upon relaxation. Thirdly, the slots provide lateral flexibility in addition to rotational flexibility, so that the tendency of the legs 26, 27 to pull inwardly as they arch can be accommodated.

As particularly shown in FIG. 3C, when the actuator member 22 is evenly heated, the difference in coefficients of thermal expansion of the silicon and the nickel causes the legs 20, 22 to arch, lifting the boss 18 in an irrotational motion away from the valve seat 16. When the boss 18 is spaced apart from the seat substrate 12, the flow via 14 is in fluid communication with a surrounding volume 24. In turn, this volume 24 is in fluid communication with an apparatus to or from which flow is to be regulated by the microminiature valve 10. (Alternatively, there may be actuation by means other than arching legs). The valve seat includes a bearing surface 16 against which the boss 18 is seated when the boss is in the closed position.

Closing of the microminiature valve 10 occurs upon cooling of the legs 26 and 27, via heat flow out through the suspension and into the seat substrate 12. The closing speed of the valve is largely determined by the thermal mass of the actuator member 22 and the thermal resistance of the suspension.

While the microminiature valve 10 is described as including an array of legs 26 and 27, the present invention is not limited to actuation by means of arching legs. For example, a structure that connects the central boss 13 to the fixed periphery 17 may instead be provided as a solid circular diaphragm which is selectively deflected to regulate fluid flow between the flow via 14 and the surrounding volume 24.

Another embodiment of the valve 10 may be constructed as a normally-open microminiature valve that operates in a similar manner as the above-described embodiment. Placement of the circumferential slots at the inner ends of legs 26, 27 in lieu of at the distal ends allows the actuator face 11 to be displaced downwardly to seal the valve seat 16 upon thermal actuation.

Figure 3D:
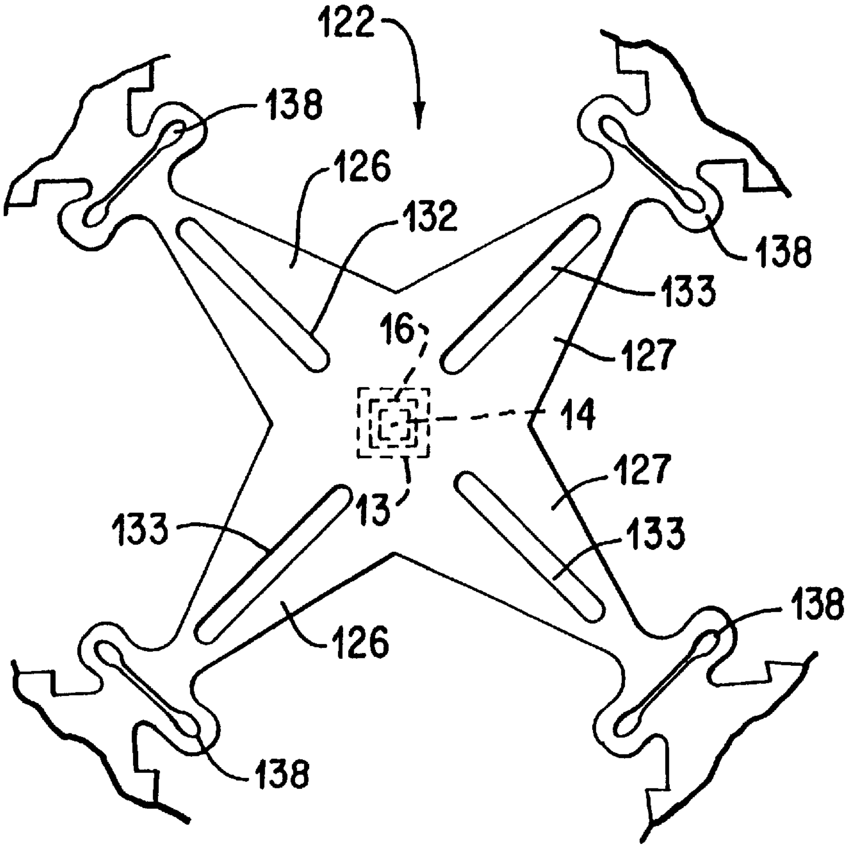
FIG. 3D is a simplified plan view of an alternative embodiment of the actuator member of the microminiature valve of FIG. 3A.

As illustrated in FIG. 3D, modifications to the actuator member 22 include at least one particularly preferred configuration having four diametrically opposed legs provided in an "X" configuration. The alternative actuator member 122 includes opposing legs 126, 127 having respective embedded heating elements 132, 133 and slots 138. A spiral of legs is a possible alternative to the radially extending legs. In some applications, it may be desirable to omit the downwardly-depending boss 13.

Turning now to FIGS. 4A–4E, the the valve 10 may be understood to operate in a novel fashion to minimize or eliminate the effect of "snap" by way of asymmetrical thermal actuation. In the preferred embodiment, valve 10 employs a generally symmetrical actuator structure but is subject to asymmetric heating. For an actuator with four leg suspensions as shown in FIGS. 3A–3D, a portion of the actuator is selectively heated (e.g., a pair of adjacent legs 26) while the remainder of the actuator is not actively heated. (A variation of this design would employ unequal resistors on the legs 26, 27). The preferred embodiment maximizes the rotational displacement by ensuring that an edge of the valve 16 seat acts as a fulcrum with respect to the rotation of the actuator face 11. A series of cross-sectional drawings showing the progress of the rotational effect as the valve opens is illustrated by the progression from FIGS. 4A to 4E.

Figure 4A:
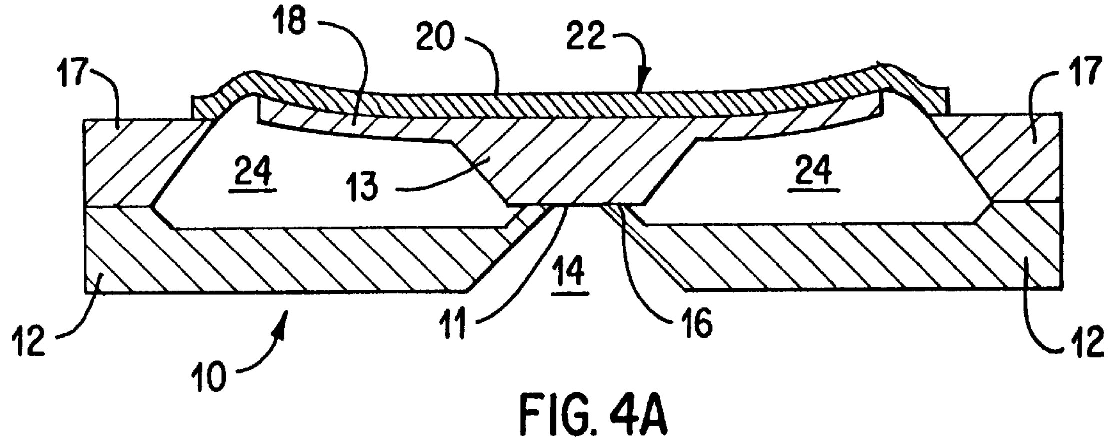
FIGS. 4A–4E are side sectional views of the microminiature valve of FIG. 3A during rotational movement of the actuator face.

In FIG. 4A the left and right sides of the actuator member 22 are unheated. The legs 26, 27 are concave up as seen from the top of the actuator member.

Figure 4B:
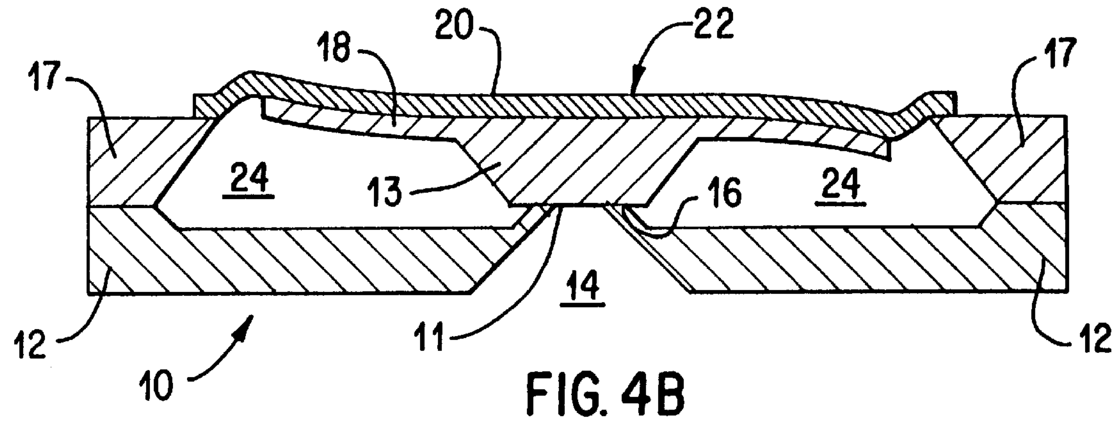

In FIG. 4B, the left side of actuator member 22 is unheated; the right side of the actuator member 22 is actively heated to a temperature greater than the neutral temperature of the left side of the actuator member 22. The left legs 26 are concave up. The valve 10 remains closed.

Figure 4C:
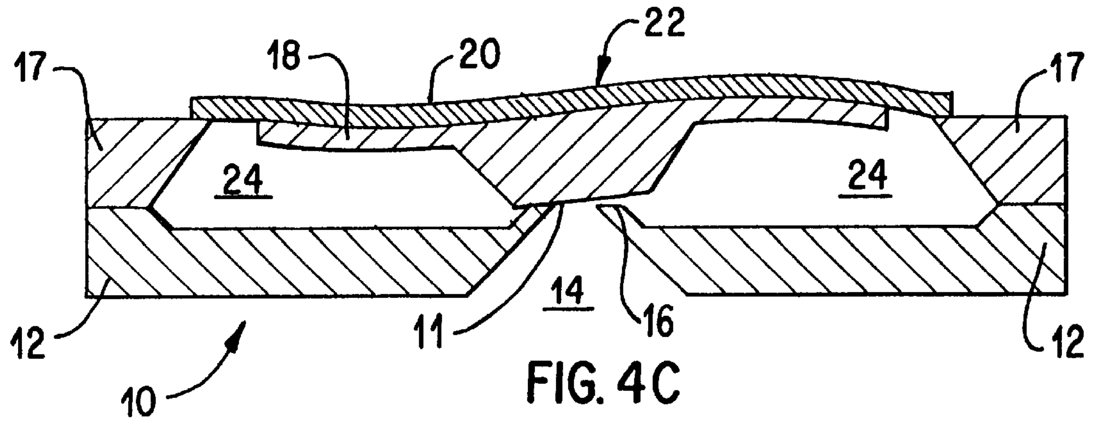

In FIG. 4C, the left side of actuator member is unheated and the right side of actuator member 22 is heated additionally. The boss is thereby subject to lifting from the valve seat, with left edge of valve seat acting as a fulcrum.

Figure 4D:
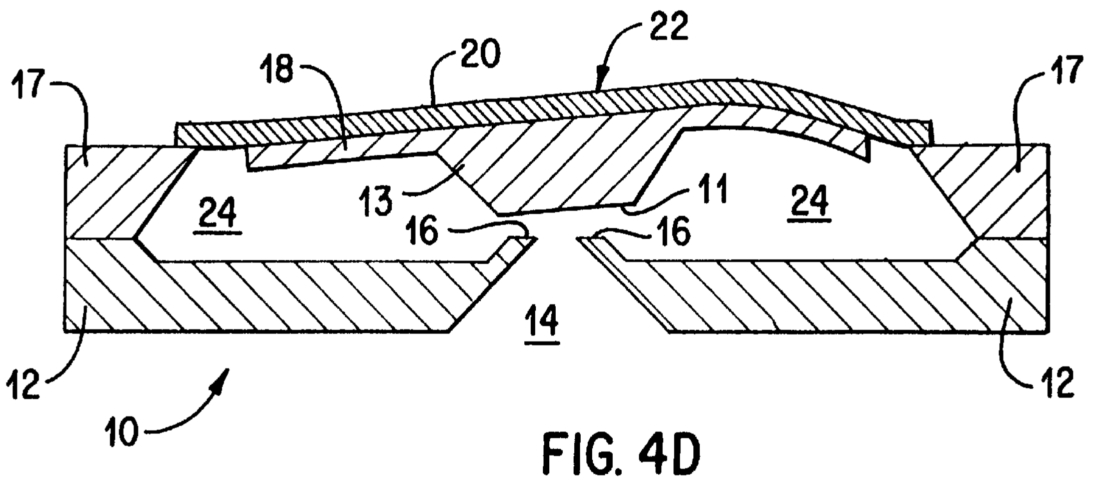

In FIG. 4D, the temperature of the right side of the actuator member 22 continues to increase; the temperature of the left side of actuator member 22 begins to increase but lags the temperature increase experienced by the right side of the actuator member 22. Boss 13 begins to lift off valve seat 16, with some rotational angle still present.

Figure 4E:
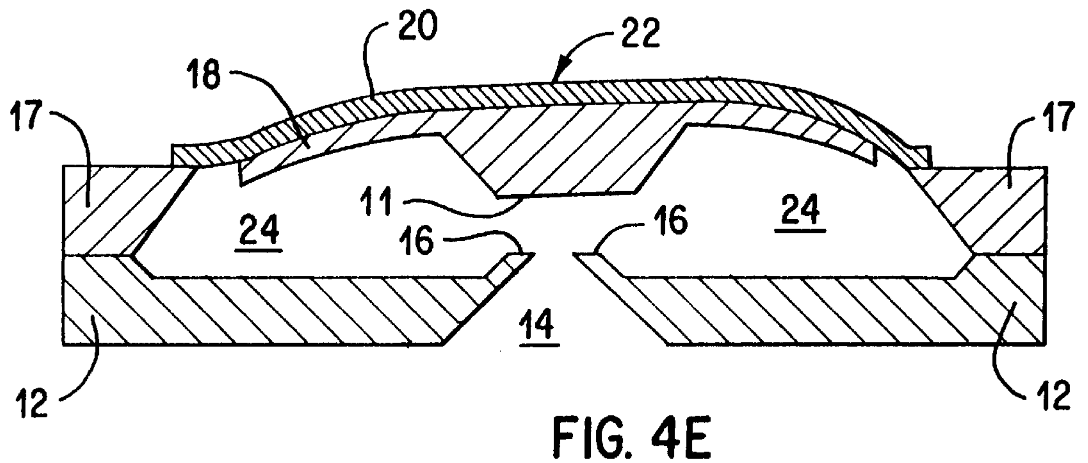

In FIG. 4E, both of the left and right sides of the actuator member 22 have experienced a substantial temperature increase; the boss 13 is fully displaced from the seat 16, and the rotational angle has decreased to nearly zero.

The loss of heat from the actuator member 22, and its effect on the relationship between the temperatures of a heated and an unheated leg, may be understood as follows. As shown in FIG. 4A, at lower than room temperature (25° C.), no power is applied to the valve 10. The legs 26, 27 are subject to the same temperature. As power is supplied and before the onset of rotational displacement, the actuator face 11 remains in contact with the valve seat 16 and all legs experience equal thermal resistances between the actuator member 22 and the seat substrate 12. The ratio of temperature between a heated and unheated leg is usually a constant.

When heated legs achieve a sufficient temperature, the boss 13 starts to rotate. Upon separation from the valve seat by the boss 13, the heated legs each experience an increased thermal resistance in the path between the heated leg and the valve seat. The heated legs then begin to experience an increased flow of heat via a path through the 22 member and the unheated legs. The differential of the temperatures of the heated and unheated legs then declines. (However, each heated leg continues to be subject to a higher temperature than any unheated leg, and therefore the desired rotational displacement continues.) With sustained power applied to the heating elements on the heated legs, the unheated leg temperature continues to rise to a point at which the unheated legs begin to deflect, thus causing the boss to lose all contact with the valve seat. The remaining temperature gradient from the heated leg to the unheated leg to the frame of the actuator member 22 forces the rotational displacement to continue. Continued application of power can, in some applications, cause the unheated leg to increase in temperature until fully deflected. However, it is believed that most applications require a range of actuator member 22 movement that does not necessitate the unheated leg to lift off.

The maximum temperature difference between the heated and the unheated legs in most applications is preferably made less than 30 degrees C. Given such a small temperature difference, differential annealing of the legs is unlikely to happen. Accordingly, a microactuator constructed according to the present invention is not expected to experience the effects of aging in an asymmetrical fashion, and therefore the microactuator is not expected to become unbalanced after periods of repeated operation.

Figure 5:
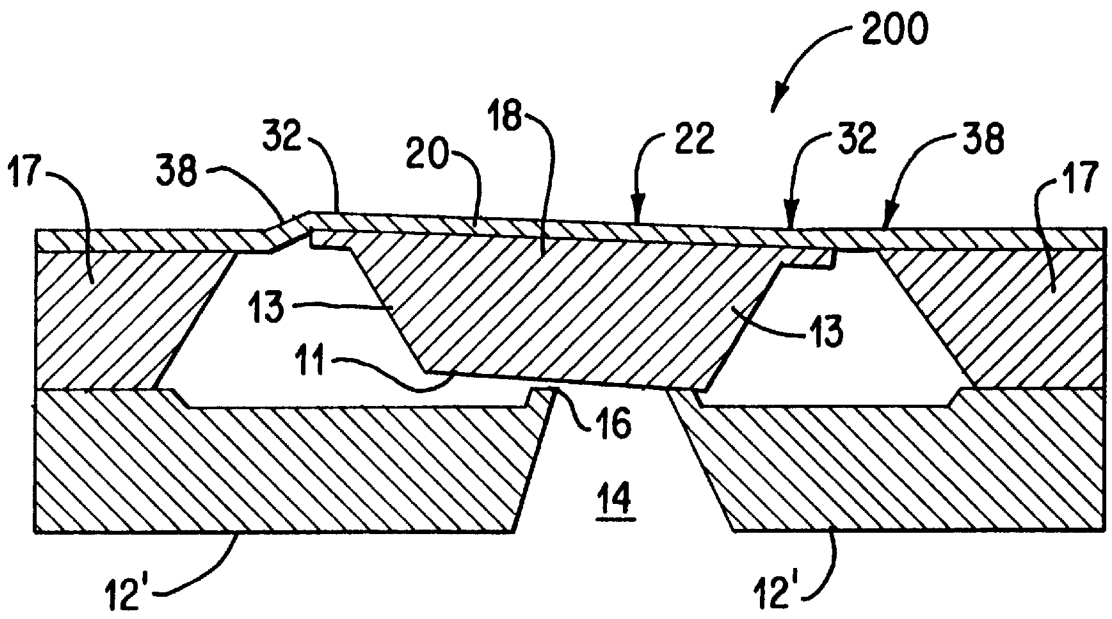
FIG. 5 is a simplified side sectional view of an alternative embodiment of the microminiature valve of FIG. 3A.

FIG. 5 illustrates an alternative embodiment 200 of the valve, wherein the contemplated thermal asymmetry may be realized by constructing the valve 200 to include boss 13 having the actuator face 11 on the bottom of the central body but at a position that is laterally offset with respect to the center of the valve seat 16. As a result, when the valve 200 is closed, the distribution of thermal resistances in the thermal paths from the actuator member 22 to the seat substrate 12 is asymmetric. A substantially symmetric distribution of heat applied to the actuator member 22 is dissipated to a greater extent in one portion of the seat substrate 12 in comparison to the remainder of the seat substrate 12, thus causing the actuator member 22 to experience a substantially asymmetric distribution of heat. The actuator member 22 is thereby subject to asymmetrical actuation as if the distribution of applied heat had been applied asymmetrically.

One intended application of the microminiature valve 10 is gas chromatography. The valve 10 may be used in an application to control gas flow from a tank into an injection reservoir of a gas chromatograph. A flow sensor may be included to measure flow and provide a feedback to electrically control the valve 10 to adjust gas flow to a desired amount. A prototype version of valve 10 having an orifice diameter of approximately 200 micrometers was found to control supply pressures of up to 200 psi at flow rates of up to 5 liters/minute. By applying an appropriate control signal to the valve, it may be caused to a controllable amount of displacement of the actuator face of between 0 and 50 microns.

In conclusion, a microactuator constructed according to the present invention minimizes or eliminates the undesired thermal “snap” observed in the actuation of a conventional thermally-actuated microminiature device. The present invention contemplates the provision of rotational motion in an actuator member via the construction of the microactuator to include: a) a symmetric bimetallic structure and means for causing asymmetric heating of the bimetallic structure; b) an asymmetric bimetallic structure and means for causing asymmetric heating of the bimetallic structure; or c) an asymmetric bimetallic structure or an asymmetric actuator member and means for heating the bimetallic structure. Generally, a symmetric device structure offers the advantage that the thermally-actuated device will not open when chilled; the contemplated thermal asymmetry promotes rotational opening only when the actuator member is powered. The rotational motion is also intended to enable movement of the actuator member to achieve a well-controlled succession of very small incremental changes even while presented with a very high opposing force from, e.g., a supply gas.

As previously noted, one goal in the design of the thermally actuated valve 10 was to minimize wasted thermal power. However, in the embodiments described herein, the asymmetrical thermal actuation may be advantageously employed to provide rotational displacement of the actuator face 11 to a position proximate to the valve seat 16 without the application of the high power that would otherwise be required in a thermally-actuated valve constructed according to the prior art. As a result, the power consumption to achieve a given displacement of the boss 13 at a given temperature of the legs 26, 27 is reduced.

Modifications in the structure of the disclosed embodiments may be effected by use of differing patterns in the etch-resistant coatings. Furthermore, while the disclosed embodiments of the present invention have been described as being fabricated from a silicon substrate, other materials such as metal, glass, ceramic, or polymers, and other semiconductor or crystalline substrates such as gallium arsenide, may also be used. For example, the structures described herein may be fabricated according to one or more of the following alternatives: borosilicate glass may be fabricated using ultrasonic machining; photosensitive glass may be formed by lithography; a ceramic material may be ultrasonically machined or may be cast and fired; a metal or machinable ceramic may be formed by conventional machining; or a polymer may be machined, cast, or injection molded.

What is claimed is:

1. A method for asymmetrical thermal activation of a microactuator, comprising the steps of:

providing an actuator member in the microactuator, said actuator member having an actuator face on a central body and having a plurality of spaced, layered regions extending from said central body to a peripheral region, wherein first and second layers of said layered regions have substantially different coefficients of thermal expansion; and effecting asymmetrical thermal actuation of said layered regions wherein said asymmetrical thermal actuation causes rotational displacement of said actuator face from a first rest position to a second actuated position.

2. A microactuator, comprising:

an actuator member having an actuator face on a central body having a plurality of spaced, layered regions extending from said central body to a peripheral region, wherein first and second layers of said layered regions have substantially different coefficients of thermal expansion, and means, thermally coupled to said layered regions, for effecting asymmetrical thermal actuation of said layered regions, wherein said means for asymmetrical thermal actuation causes rotational displacement of said actuator face from a first rest position to a second actuated position.

3. The microactuator of claim 1 wherein said layered regions are distributed asymmetrically with respect to said central body.

4. The microactuator of claim 1, wherein said asymmetrical thermal actuation means includes heating elements operatively coupled to selected portions of said layered region and wherein said heating elements being located asymmetrically so as to effect a corresponding asymmetrical pattern of heat in said selected portions of said layered regions.

5. The microactuator of claim 1, wherein said asymmetrical thermal actuation means includes heating elements operatively coupled to selected portions of said layered region and further comprising means to activate selected ones of said heating elements so as to obtain, when activated, a greater amount of heat in selected portions of said layered regions as compared to other portions of said layered regions.

6. The microactuator of claim 1 wherein said layered regions are bimorphic, radially extending legs arranged in opposing pairs and wherein said asymmetrical thermal actuation means further comprises means for heating selected ones of said pairs of legs, wherein the opposing legs in said pair are differentially heated to thereby effect asymmetrical thermal actuation of the actuator member.

7. The microactuator of claim 1 wherein a leg includes operable first and second layers of said layered regions, while a selected other leg lacks operable first and second layers of said layered regions, whereby activation of the operable first and second layers thereby causes asymmetrical thermal actuation of the actuator member.

8. A microminiature valve for controlling the flow of a fluid comprising:

a seat substrate having a flow orifice defined therethrough, a flexural member coupled to said seat substrate to selectively block said flow orifice, said flexural member having an actuator face on a central body in alignment with said flow orifice and having a plurality of spaced, layered regions extending from said central body to a peripheral region, first and second layers of said layered regions having substantially different coefficients of thermal expansion, and means, thermally coupled to said layered regions, for asymmetrical thermal actuation of said layered regions wherein said means for asymmetrical thermal actuation, when operated, causes rotational displacement of said actuator face relative to said flow orifice.

9. The valve of claim 8 further comprising suspension means for supporting said layered regions to one of said central body and said peripheral region, said suspension means having slots aligned to accommodate rotational motion and thermal expansion of said layered regions.

10. The valve of claim 8 wherein said layered regions are distributed asymmetrically with respect to said central body.

11. The valve of claim 8 wherein said layered regions are bimorphic, radially extending legs.

12. The valve of claim 11 wherein said legs are arranged in opposing pairs and wherein said asymmetrical thermal actuation means further comprises means for heating selected pairs of legs wherein the opposing legs in said pair are differentially heated so as to effect asymmetrical thermal actuation of the layered regions.

13. The valve of claim 11 wherein selected leg includes an operable bimetallic member, while certain other legs lack an operable bimetallic member, whereby activation of the operable bimetallic members thereby causes asymmetrical thermal actuation of the actuator member.

14. The valve of claim 11 wherein said radially extending legs are distributed asymmetrically with respect to said central body of said flexural member.

15. The valve of claim 11 wherein said asymmetrical thermal actuation means includes heating elements operatively coupled to selected portions of said layered regions.

16. The valve of claim 15 further comprising means to activate selected ones of said heating elements so as to obtain, when activated, asymmetrical thermal actuation of said layered regions.

17. The valve of claim 15 wherein said heating elements exhibit differing resistance values so as to obtain, when activated, asymmetrical thermal actuation of said layered regions.

18. The valve of claim 8 wherein said valve seat and said central body are laterally offset to a degree sufficient to cause asymmetrical heat dissipation and wherein said asymmetrical heat dissipation causes asymmetrical thermal actuation of said layered region.

* * * * *